Jan. 27, 1931.  R. J. PIERSON  1,790,511
AUTOMATIC SIGNAL SWITCH FOR VEHICLES
Filed Dec. 22, 1927
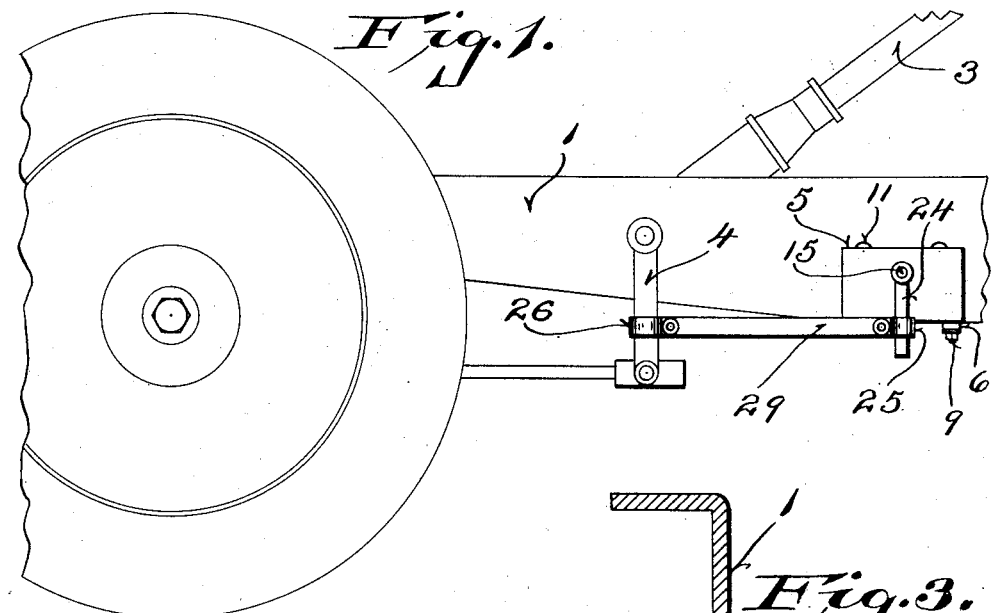
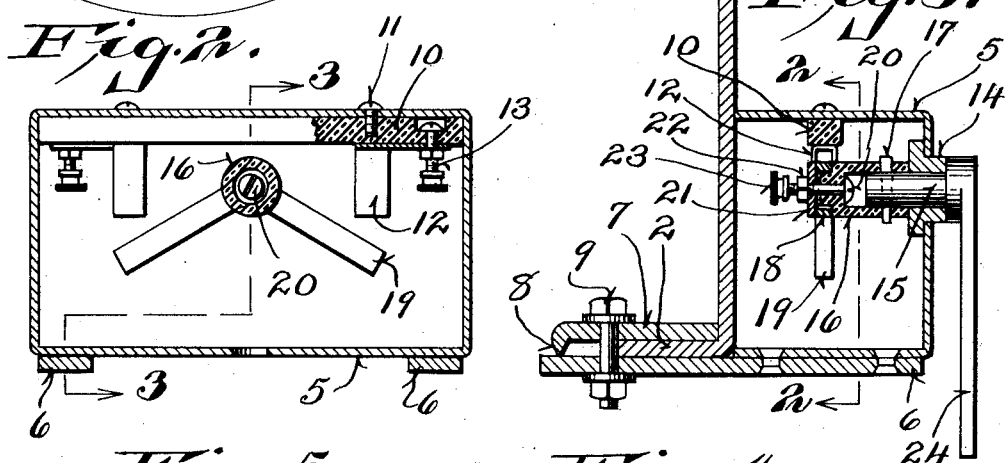
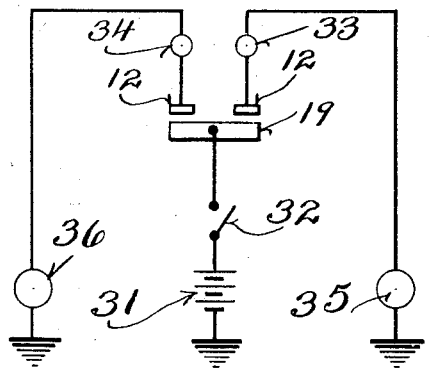
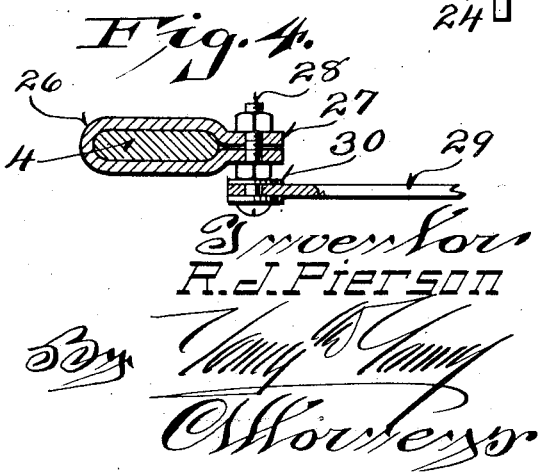
Inventor
R. J. Pierson Patented Jan. 27, 1931

1,790,511

UNITED STATES PATENT OFFICE

REED JOSEPH PIERSON, OF JANESVILLE, WISCONSIN

AUTOMATIC SIGNAL SWITCH FOR VEHICLES

Application filed December 22, 1927. Serial No. 241,813.

This invention relates to an automatic signal for vehicles.

Objects of this invention are to provide a novel form of signalling device for vehicles, such as automobiles, so that the device will indicate the direction of turn automatically and without any thought on the part of the operator, and to provide such a device with the signal lamps mounted at the rear of the machine to apprise a following driver of the direction of turn.

Further objects are to provide tell-tale lights which may be mounted on the dashboard to indicate the condition of the circuit so that the driver is at once apprised of the fact that the rear light is burning and the circuit intact. The tell-tale light is extinguished when the rear light burns out.

Further objects are to provide a device which is adapted for attachment to an automobile without requiring any change whatsoever in the automobile structure, but which instead may be clamped, by an unskilled person, to an automobile side frame bar, and may be adjustably connected to the steering arm of the automobile so as to properly adjust the device and cause the correct throw of the switch mechanism.

An embodiment of the invention is shown in the accompanying drawings in which:

Figure 1 is a fragmentary side elevation of the front of an automobile showing the steering column, the steering arm, and the device in place;

Figure 2 is a sectional view through the device corresponding to the line 2—2 of Figure 3;

Figure 3 is a transverse sectional view on the line 3—3 of Figure 2;

Figure 4 is a sectional view showing one of the clamps for attaching the connecting link;

Figure 5 is a diagrammatic view of the wiring.

Referring to the drawings, it will be seen that an automobile has been shown as provided with the side frame bar 1 having upper and lower flanges 2. Further, the automobile is provided with the usual steering column 3 and with the steering arm 4.

The device consists of a metal box-like member 5 which is riveted or otherwise secured to a base plate 6. This base plate is adapted to extend beneath the bottom flange 2 of the side frame bar. A clip 7 is positioned above the bottom flange and is provided with a downturned lip 8 adapted to bear upon the plate 6. The plate and clip are apertured for the reception of the clamping bolt 9. This clamping bolt extends just inside of the inner edge of the bottom flange 2 and thus prevents the device from slipping outwardly even if the bolts should become slightly loosened. In addition to this, the box 5 bears against the outer face of the side frame bar 1 and thus prevents inward motion of the box. The device is preferably secured by means of two spaced bolts, one of which is indicated in Figure 1.

Within the box 5 an insulating block 10 is positioned and secured by means of screws 11. This insulating block carries a pair of stationary contacts 12 which are equipped with binding posts 13 adapted to receive wires.

The box carries a bearing 14 through which a stub shaft 15 projects. This stub shaft is provided with a cotter pin hole and receives an insulating shell 16. The shell is secured in place by means of the cotter pin 17, as shown in Figure 3. The shell is slightly reduced at its outer end and receives the hub 18 of a pair of movable contact arms 19. A bolt or screw 20 extends through the end of the member 16 and through a washer 21. The washer is locked in place by means of a nut 22, and a binding nut 23 is also screwed upon the bolt 20 in order to clamp one of the wires in place.

The outer end of the stub shaft 15 carries a rock arm 24 which projects downwardly, as shown in Figure 1. The rock arm and the steering arm are each provided with clamps indicated respectively by the reference characters 25 and 26 in Figure 1. One of these clamps, for instance, the clamp 26, is shown in section in Figure 4. It will be seen that the clamps are provided with spaced arms 27 which are drawn towards each other by means of the bolt 28. This bolt is provided with nuts on opposite sides of the lips 27 in order to clamp it in place and to cause the clamps to bind against the respective arms. The bolt projects outwardly and receives the connecting link 29 which operatively joins the arms 4 and 24. Preferably, a pair of washers 30 are positioned on opposite sides of the link 29, as shown in Figure 4. Thus, when the steering arm is rocked the switch operating arm 24 is correspondingly rocked and the movable contact members 19 engage one or the other of the stationary contact members 12, as is obvious from Figure 2.

Further, it is a simple matter to correctly adjust the throw of the switch operating arm by properly adjusting the clamps 25 and 26 upwardly or downwardly upon their respective arms.

Various schemes of wiring the device may be employed, for instance, that shown in Figure 5. Referring to this figure, it will be seen that the usual battery 31 is provided and has one end grounded. The other end is connected through a manually controlled switch 32 to the movable contacts 19. These movable contacts are adapted to move into engagement with one or the other of the stationary contacts 12, depending upon the direction of turn. The contacts 12 are connected through tell-tale lights 33 and 34 to one side of the rear lights 35 and 36. The other side of the rear lights are grounded, as indicated in Figure 5.

Assuming, for instance, that the manually controlled switch 32 is closed, as it customarily is in the normal operation of the apparatus, it is apparent that when a turn is made, the movable contacts 19 engage one or the other of the stationary contacts. Assume that a right hand turn is to be made, the contact member 19 rocks in a counter clockwise direction, as viewed in Figure 5, and consequently permits current to flow from the battery 31 through the tell-tale light 33 and through the rear signal light 35, thus apprising the approaching driver of the direction of turn.

Obviously, a turn to the left would allow the illumination of the lights 34 and 36.

It is apparent that the tell-tale lights may be mounted upon the dash and will warn the driver if either of the signal lights is burned out.

It is to be noted that the exact adjustment for the throw of the switch is readily obtained by adjusting the clamps upwardly or downwardly along the switch arm or along the steering arm.

Although the invention has been described in considerable detail, such description is intended as illustrative rather than limiting as the invention may be variously embodied and as the scope of such invention is to be determined as claimed.

I claim:

In a device of the character described, a box-like member, an insulating block secured to one side thereof within the box, a rotatable shaft extending through one side of the box, an insulating shell carried by the shaft and formed with a reduced closed inner end, a hub on the reduced end, a bolt having its threaded portion passed through the reduced end axially of the shell, a washer on the bolt for retaining the hub thereon, a nut on the bolt engaging the washer, stationary contacts carried by the insulating block and arranged in spaced relation, angularly disposed arms carried by the hub and attached to engage with the stationary contacts, a rocking arm secured to the outer end of the shaft and means having connection with the arm for imparting movement to the hub to engage and disengage the arms with the stationary contacts.

In testimony that I claim the foregoing I have hereunto set my hand at Janesville, in the county of Rock and State of Wisconsin.

REED JOSEPH PIERSON.